United States Patent

Meloling et al.

[11] Patent Number: 5,285,653
[45] Date of Patent: Feb. 15, 1994

[54] REFRIGERANT FLOW CONTROL DEVICE

[75] Inventors: Steven E. Meloling, Cicero; Zoltan P. Mandy, Camillus, both of N.Y.

[73] Assignee: Carrier Corporation, Syracuse, N.Y.

[21] Appl. No.: 998,460

[22] Filed: Dec. 30, 1992

[51] Int. Cl.5 .............................................. F25B 41/04
[52] U.S. Cl. ...................... 62/218; 137/192; 137/430
[58] Field of Search ................... 62/218, 219; 137/192, 137/193, 194, 398, 399, 429, 430, 432

[56] References Cited

U.S. PATENT DOCUMENTS

| | | | |
|---|---|---|---|
| 130,490 | 8/1872 | Dick | 137/192 X |
| 2,051,802 | 8/1936 | Philipp | 62/218 X |
| 2,087,913 | 7/1937 | Kenney et al. | 62/218 X |
| 3,315,481 | 4/1967 | Check et al. | 62/218 X |
| 4,256,136 | 3/1981 | Crawford | 137/429 X |
| 5,009,079 | 4/1991 | Zinsmeyer | 62/218 |

FOREIGN PATENT DOCUMENTS 426631 4/1935 United Kingdom ................... 62/218

Primary Examiner—Harry B. Tanner

[57] ABSTRACT

A float-type refrigerant control device meters the flow of saturated refrigerant liquid condensate to a subsequent stage from an outlet of a sump in a refrigerant condenser. A float in the form of a metal shell open at the bottom is slidably positioned on an upright, generally cylindrical standpipe which is mounted at the outlet of the sump. A metering sleeve situated within the standpipe is joined to the float for axial travel with the float. One or more metering slots penetrate the standpipe near its lower end, and these are uncovered by the sleeve as the float rises to permit the liquid to flow out through the sump outlet. A vapor injection duct supplies refrigerant vapor from a high pressure source to the float to keep the same replenished with vapor, thereby maintaining a positive buoyancy relative to the saturated refrigerant liquid condensate in the sump.

10 Claims, 3 Drawing Sheets

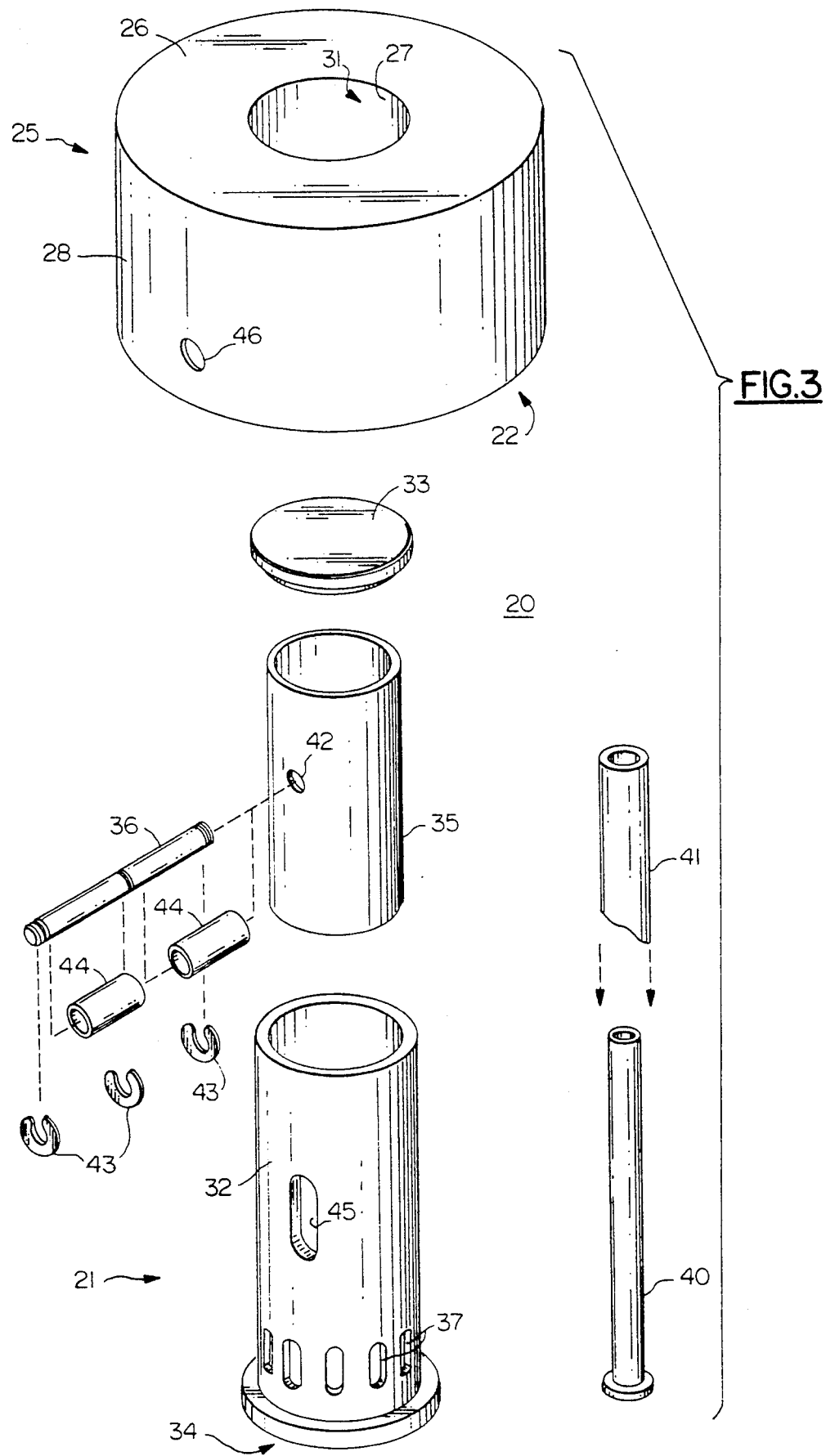

REFRIGERANT FLOW CONTROL DEVICE

BACKGROUND OF THE INVENTION

This invention relates generally to refrigeration and air conditioning systems, and is more particularly directed to a flow control device for regulating the flow of condensed refrigerant liquid between the condenser and evaporator of a system.

In a centrifugal or rotary-screw water-chiller refrigeration system, condensed refrigerant flows to a lower sump portion of a condenser from which it must then be metered out to an evaporator. A flow control unit ensures that only condensed refrigerant liquid passes to the cooler, i.e., flooded evaporator and blocks any flow of refrigerant gas from the condenser to the cooler. In other words, the control unit maintains a liquid seal during operation of the system to improve system efficiency.

One approach to this is described in U.S. Pat. No. 5,009,079 granted to Thomas M. Zinsmeyer Apr. 23, 1991. In that patent, the control device includes a standpipe that extends upwardly from an outlet of a condenser sump, with a number of vertical openings spaced about the cylindrical wall of the standpipe near its lower end. A ring-shaped float is fitted closely over the standpipe so as to close off the standpipe openings when the level of the refrigerant liquid is below a minimum level. Then when the refrigerant level rises, the float rises with it, and uncovers the openings. This allows more refrigerant to flow through to subsequent stages, including the evaporator or chiller.

An improved version of this is described in U.S. patent application Ser. No. 07/822,784, filed Jan. 21, 1992, U.S. Pat. No. 4,209,080, having a common assignee, where a cylindrical metering sleeve is disposed within the cylindrical standpipe. That arrangement avoids binding between the float and standpipe, which could impair operation of the refrigerant flow control device. In each of these the float is formed of a ceramic or glass foam material, for example a slurry of microballs held together by epoxy adhesive, or another alternative ceramic or glass closed-cell foam.

This construction has some disadvantages, which can lead to inefficient system operation. One problem is that the float itself is somewhat delicate and brittle, and thus must be very carefully handled during manufacture and installation. The float is also quite expensive to manufacture. Moreover, after an extended period of use, the closed cells or microballs of the float tend to crack, and many of them fill with the refrigerant liquid. This makes the float somewhat less buoyant as the float material ages, causing the device to sink below its original level. As a result, flow at an improper rate of refrigerant liquid occurs, resulting in improper machine operation.

For environmental reasons, modern refrigeration systems often employ alternative refrigerants, such as R22, which are regarded as less dangerous to the environment if the material escapes from the system. However, a refrigerant such as R22 requires much higher operating saturation pressures, as it is a much more dense refrigerant vapor than others in common use previously. There are two consequences: First, the use of a higher vapor density refrigerant reduces the amount gas bypass that can be tolerated then otherwise. Bypass of vapor into the evaporator can reduce efficiency and can increase parasitic losses. Second, because the refrigerant liquid is rather dense, the foam or glass microsphere float becomes much heavier as the cracked cells or spheres become filled with the refrigerant liquid. This causes the float to sink below its design operating level.

It is therefore an object of the present invention to provide an improved refrigerant flow metering device which can be employed reliably with a modern centrifugal chiller system.

It is another object of this invention to provide a refrigerant flow control device which functions consistently over its lifetime, limiting bypass of refrigerant gas without undesired restriction of the liquid flow between stages.

It is a still further object of this invention to provide a refrigerant flow control device that is durable and less expensive than previous designs, and yet achieves increased reliability.

SUMMARY OF THE INVENTION

In accordance with one aspect of this invention, a float-type refrigerant flow control device is positioned on the outlet of a sump in a refrigerant condenser, where compressed refrigerant vapor is condensed and collects. The flow control device meters the liquid flow from the sump to a subsequent stage based on the level of the saturated liquid in the sump. A standpipe is vertically disposed on the outlet of the sump. The standpipe has a generally cylindrical wall, with an open lower end disposed at the outlet and a closed upper end. There is at least one metering slot extending axially on the standpipe through its cylindrical wall near the lower end. In one preferred embodiment there are twelve such metering slots, disposed about the circumference of the cylindrical wall. A generally cylindrical metering sleeve is slidably disposed within the standpipe, and is axially displaceable over at least a limited distance. This sleeve has a lower edge that gates the saturated liquid flow from the sump through at least one metering slot. An annular float member is slidably disposed on the standpipe, and floats on the saturated refrigerant liquid in the sump. A float shaft or other equivalent structure joins the float member through the standpipe to the metering sleeve. The float member raises or lowers the sleeve as a function of the vertical position of the float member along the standpipe. Preferably, the float member is in the form of a hollow annular shell that is closed except at the bottom, which is closed off by the saturated liquid in the sump. This defines an internal volume within the shell. This float is kept filled with vapor of the refrigerant. A vapor injection jet is supplied from a conduit coupled to the high pressure side of the condenser, and supplies a sufficient amount of the refrigerant vapor to the annular chamber to keep the same inflated. This ensures, in operation, that the float member maintains a positive buoyancy relative to the saturated refrigerant condensate liquid in the sump. In a preferred embodiment, the float member shell has inner cylindrical wall that is slidably disposed over the standpipe, an outer cylindrical wall disposed coaxially with the inner cylindrical wall, and an upper annular plate that unites the inner and outer cylindrical walls at their upper edges. The inner and outer walls and the annular plate are welded, brazed, or formed so that there are no openings or gaps at the top of float member through which the refrigerant vapor can escape. In a preferred mode, the float member and metering sleeve are arranged so that when they drop to the lower limit of their travel, at least a portion of the metering slot or slots remains uncovered. This permits flow, through the slots, of the refrigerant fluid at start up, or in the event that the float is sunk to the bottom of its travel. This generates a flow of higher-pressure vapor to the gas injection pipe.

In the Drawing as hereinafter described a preferred embodiment is shown. However, many objects, features, and advantages of this invention will become apparent from the ensuing description of the preferred embodiment, which should be read in connection with the accompanying Drawing.

BRIEF DESCRIPTION OF THE DRAWING

FIG. 3 is an exploded assembly view of the flow control device of a preferred embodiment of the invention.

DETAILED DESCRIPTION OF THE PREFERRED EMBODIMENT

Figure 1:
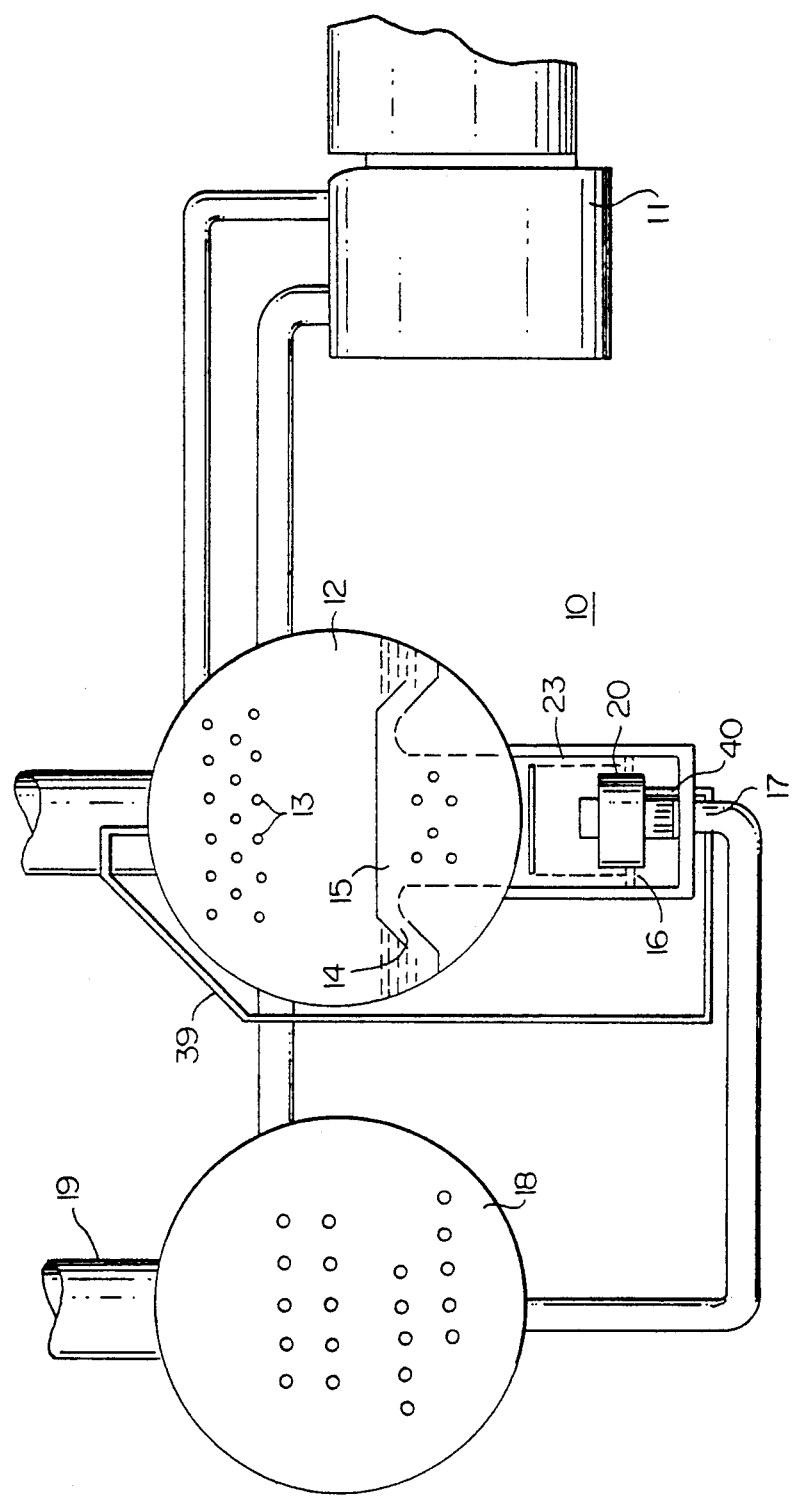
FIG. 1 is an schematic diagram of a chiller system that incorporates the fluid control device of one embodiment of the present invention.

With reference initially to FIG. 1 of the Drawing, a centrifugal refrigeration system 10 is illustrated, with a centrifugal compressor 11 supplying compressed refrigerant gas to a condenser 12, where heat is exchanged between the refrigerant vapor and water which is carried in tubes 13. The refrigerant condenses on these tubes and collects in an upper sump 14. This liquid, which is at elevated pressure, passes through small control orifices into a FLASC (flash condenser or low pressure series condenser) chamber 15, where the refrigerant flashes to a somewhat lower pressure and condenses again at a lower temperature. The condensed liquid descends and collects in a lower sump 16. The sump has an outlet 17 its base, where a conduit conveys the condensed refrigerant liquid to a cooler or flooded evaporator 18, where the refrigerant evaporates. The expanding vapors absorb heat away from water flowing through the cooler 18, and the water flows out through a cold water outlet 19, and is distributed therefrom throughout a building for space cooling, for example. The evaporated refrigerant vapor then flows from the cooler 18 to a high pressure or suction side of the compressor 11, and the cycle is repeated.

Figure 2:
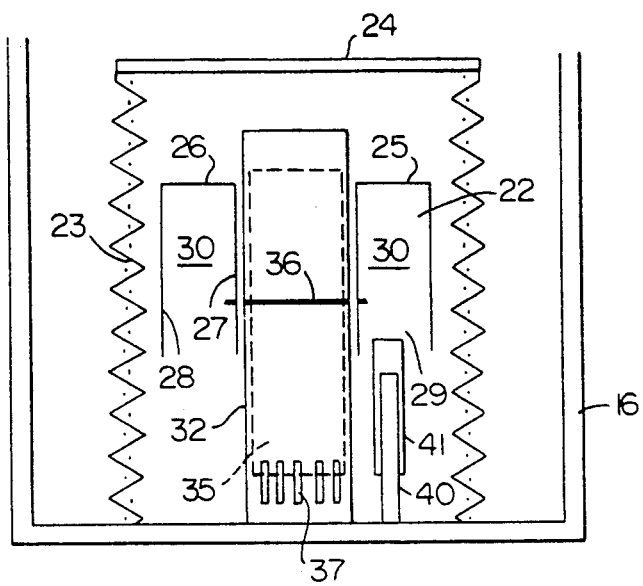
FIG. 2 is an enlargement of a portion of FIG. 1, showing details of the control device.

The flow control device 20, as shown in FIG. 2 and in FIG. 3, has a standpipe 21, which is an upright, generally cylindrical member, with an open lower end fitted upon the sump outlet 17. A float member 22 slidably fits unto the standpipe 21, and floats upon the condensed refrigerant liquid in the lower sump 16. A generally cylindrical screen 23 surrounds the device 20, and a roof 24, disposed overhead above the standpipe 21 and float 22, prevents liquid condensate from impacting down directly unto the float 22.

The float itself is in the form of a metal shell 25, preferably of aluminum, with a flat annular disk 26 serving as a top wall, an inner cylinder 27 and an outer cylinder 28 coaxial therewith, and these cylinders 27, 28 are brazed, welded or formed at their upper edges to the disk 26. As shown in FIG. 2, the shell 25 has an open bottom 29, where the surface of the saturated refrigerant liquid condensate closes off the shell to define an inner space 30 within the shell 25. The inner cylinder 27 forms a cylindrical passage or bore 31 which faces an outer cylindrical wall 32 of the standpipe 21. These two cylindrical surfaces are formed at close tolerances.

Situated adjacent the lower end of the standpipe 21 are several axially elongated metering slots 37, which penetrate the standpipe and are preferably evenly spaced around the base of the standpipe. A cap 33 closes off the top end of the standpipe 21.

Within the standpipe is a metering sleeve 35, formed of a cylindrical tube that is open at its upper and lower ends. A float shaft 36, e.g., a metal rod, extends transversely through openings in the inner wall 27 of the float and also through the sleeve 35, so that the float 22 and sleeve 35 travel together up and down relative to the standpipe 21.

Returning to FIG. 1, a vapor injection duct 39 is shown with an inlet connected to the high pressure condenser, and an outlet disposed within the sump 16, where refrigerant gas is injected into the closed chamber 30 of the float 22. This duct 39 carries a sufficient amount of refrigerant vapor to replenish the float inner space 30 to accommodate for vapor that condenses or that may spill out of the chamber 30, for example due to changing dynamic conditions within the condenser 12, or that changes vapor density due to normal operating temperature variation, causing possible reduction of displaced volume. This is only a small fraction of the total refrigerant flow, so as not to reduce the effectiveness of the FLASC 15. As shown in FIGS. 2 and 3, a gas injection pipe attached to the conduit 39 can include a vertical feed tube 40 mounted on the floor of the sump 16, with a vertical feed overtube 41 open at its upper and lower ends which directs the vapor upwards and into the space 30 within the float 22.

As shown in FIG. 3 the metering sleeve 35 has openings 42 situated midway between its upper and lower edges, and the float shaft 36 passes through these openings. This construction, with the sleeve 35 symmetrically disposed about the openings 42, facilitates assembly, as the sleeve 35 can be installed into the standpipe with either end up.

As also shown in this embodiment, a retaining spring 43 is situated at the center of the shaft 36, and a pair of tubular spacers 44 are fitted over the shaft. Additional retaining springs 43 are positioned on ends of the shaft 36 outside the float inner cylinder 27. This construction keeps the metering sleeve 35 centered within the standpipe. Neither the outer surface of the sleeve 35 nor the bore 31 of the float contact the walls of the standpipe, as the spacers 44, springs 43 and shaft 36 maintain a small clearance between the float bore 31 and the standpipe 21 and between the sleeve 35 and the standpipe 21.

Axially elongated slots 45 are provided on diametrically opposite sides of the cylindrical sidewall of the standpipe 21. The float shaft 36 passes through these slots 45. The float 22, shaft 36 and sleeve 35 are permitted a limited amount of up and down travel with respect to the standpipe 21. The vertical metering slots 37 are arranged so that when the float 22 is at the bottom of its travel, i.e. with the shaft 36 against the lower ends of the slots 45, a small opening is left exposed at the bottom of each of the metering slots 37. This permits at least some of liquid to flow through slots 37 and the sump outlet 17 and into the subsequent cooler 18, and from there as vapor to the compressor. This permits a small amount of refrigerant to flow even when the float 22 is entirely filled with liquid, and sunk. In that case, the float 22 will eventually begin to rise as vapor is injected, via the gas injection duct 39 and the tubes 40 and 41.

In the preferred mode, the lower edge of the inner cylinder 27 of the float is positioned lower then the edge of the outer cylinder 28. This ensures there is a liquid seal between the inner cylinder and the standpipe, even under start-up conditions. Leakage around the float surfaces will be sufficient to permit condensed liquid to pass, until operating pressure is developed. To guard against the float 22 being held shut, for example because of a metal-to-metal seal between the float bore 31 and the standpipe 21, or between the sleeve 35 and standpipe 21, small clearances are provided between these members. The standpipe 21, float 22, and sleeve 35 are formed of relatively inexpensive sturdy materials, which both reduce the manufacturing cost and increase reliability.

Figure 4:
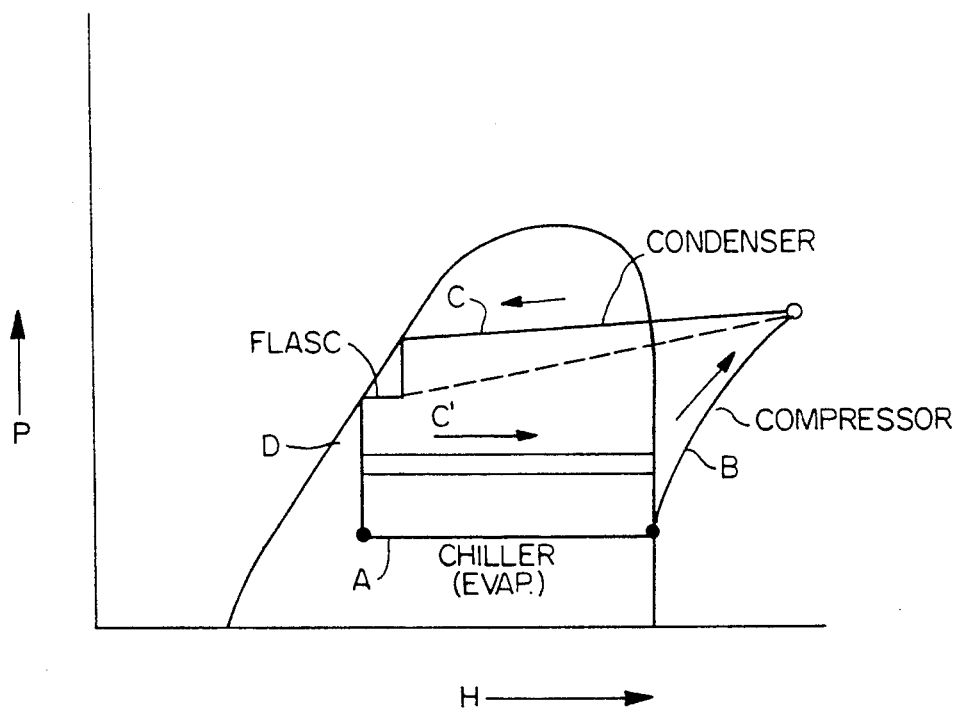
FIG. 4 is a graph showing the thermodynamic behavior of the system, pressure being represented on the ordnite and heat or enthalpy being represented on the abscissa.

FIG. 4 is a thermodynamic diagram of the behavior of the system of FIG. 1, showing phase changes between liquid and vapor as refrigerant moves from stage to stage. Curve A indicates the isobaric expansion of refrigerant vapor within the evaporator 18. Curve B illustrates the adiabatic compression of vapor in the compressor 11, and curve C represents the isobaric condensing of vapor in the main part of the condenser 12. Curve C' represents the flashing and recondensation of the refrigerant in the FLASC low pressure condenser. Curve D, which is ideally is a vertical line, shows the pressure drop through the control device 20 and outlet 17, and then through any other associated conduits on the way to the evaporator 18. Typically, for R-22 refrigerant, the pressure drop involved here is from about 200 psi in the condenser 12 to about 86 psi in the evaporator 18. For other refrigerants, such as R134a, there would be other pressure conditions. To obtain efficient operation, it is essential that the control device 20 operate with high consistency, and maintain a flow rate based on the level of the liquid in the sump 16. This will ensure that refrigerant flow into the evaporator 18, that is, that the refrigerant flow rate through the device 20 and out the sump outlet 17, is a function of system demand.

The dash line in the FIG. 4 chart represents the vapor that is injected into the float chamber 30. As mentioned previously, the conduit presents just enough make up vapor to compensate for that which condenses or escapes from the chamber 30. The amount of bypass gas into the FLASC 15 is inconsequential, and has no measurable effect on the heat exchange efficiency of the FLASC 15.

While the present invention has been described with particular reference to a preferred embodiment, the concepts of this invention are readily adaptable to other embodiments, and persons of skill in this art may vary the structure thereof without departing from the persons scope and spirit of the present invention, as defined in the claims.

What is claimed is:

1. A float-type refrigerant flow control device for metering the flow of a refrigerant liquid to a subsequent stage from an outlet of a sump of a refrigerant condenser in which compressed refrigerant vapor is condensed to liquid; the control device metering the liquid flow as a function of the level of the liquid in the condenser sump, the device comprising:

a standpipe vertically disposed in said sump and having a tubular wall, an open lower end disposed at said outlet of the sump, a closed upper end, and at least one metering slot extending axially on said standpipe through said cylindrical wall near the lower end thereof;

a generally tubular metering sleeve slidably disposed within said standpipe and axially displaceable over a limited distance therewithin, said sleeve having a lower edge that gates the liquid flow through said at least one metering slot;

a float member that is slidably disposed on said standpipe and which floats on the refrigerant liquid in said sump, including means coupled the float member through the tubular wall of said standpipe to said metering sleeve to raise or lower same as a function of the vertical position of the float member along said standpipe, said float being in the form of a hollow annular shell closed except at the bottom thereof and having a bottom side closed off by the liquid in the sump to define an internal volume within said shell; and vapor injection means for supplying vapor of said refrigerant to said float internal volume to replenish same and for ensuring in operation that said float member maintains a positive buoyancy relative to the saturated liquid condensate in said sump.

2. A flow control device according to claim 1 wherein said float member shell includes an inner cylindrical member slidably disposed over said standpipe; an outer cylindrical member coaxial with the inner cylindrical wall, and an upper annular plate united with the inner an outer cylindrical members at their upper edges.

3. A flow control device according to claim 2 wherein said inner cylindrical member, outer cylindrical member, and plate member are welded, brazed or formed so that there are no openings or gaps at the top of said float member through which the refrigerant vapor can escape.

4. A flow control device according to claim 2 wherein said float member shell is formed of aluminum.

5. A flow control device according to claim 1 wherein said vapor injection means includes a gas conduit coupled to a point of high vapor pressure in advance of said condenser sump, with an outlet feed discharging said vapor through said open bottom side of the float into said float member internal volume.

6. A flow control device according to claim 5 wherein said vapor injection means outlet feed includes a vertical gas discharge pipe having a lower end connected to said gas conduit, and an outer tube open at upper and lower ends disposed over said vertical discharge pipe.

7. A flow control device according to claim 1 wherein when said float member and said metering sleeve are disposed at a lower limit of their travel at least a portion of said at least one metering slot remains uncovered to permit flow therethrough of said refrigerant liquid.

8. A flow control device according to claim 1 wherein there are a plurality of said metering slots evenly distributed around said standpipe wall.

9. A flow control device according to claim 2 wherein a float shaft passes transversely through diametrically opposed openings in said sleeve, through corresponding vertical slots in said standpipe wall, and through diametrically opposed openings in the inner cylindrical wall of said float member.

10. A flow control device according to claim 9 wherein said metering sleeve has open top and bottom ends, and said openings into which the float shaft is fitted are disposed midway between the top and bottom ends.

* * * * *